Dec. 29, 1964

S. E. VICKERS 3,163,081

RIGHT ANGLE MILLING HEAD

Filed Sept. 13, 1962

INVENTOR.
STANLEY E. VICKERS
BY
RICHEY, McNENNY & FARRINGTON
ATTORNEYS

Dec. 29, 1964  S. E. VICKERS  3,163,081
RIGHT ANGLE MILLING HEAD
Filed Sept. 13, 1962  2 Sheets-Sheet 2

INVENTOR.
STANLEY E. VICKERS
BY
RICHEY, McNENNY & FARRINGTON
ATTORNEYS

United States Patent Office 3,163,081
Patented Dec. 29, 1964

3,163,081
RIGHT ANGLE MILLING HEAD
Stanley E. Vickers, Columbus, Ohio, assignor to Vickers Machine & Tool, Inc., Columbus, Ohio, a corporation of Ohio
Filed Sept. 13, 1962, Ser. No. 223,458
3 Claims. (Cl. 90—11)

This invention relates generally to an improved milling apparatus and more particularly to a novel and improved right-angle milling head adapted to be mounted on, and powered by drilling machines and the like.

In my copending application, Serial No. 180,168, filed March 16, 1962, I disclose a hydraulically powered drill unit which is particularly suited for automated machining wherein work pieces are automatically fed into position for a series of sequential machining operations performed by a separate power tool unit.

A right angle milling head incorporating this invention is particularly suited for mounting on power driven drilling machines such as the drill unit disclosed in the above cited application and greatly increases the utility of such drilling units by permitting them to be used for many types of milling operations.

It is an important object of this invention to provide a novel and improved milling attachment suitable for mounting on drilling machines.

It is another important object of this invention to provide a novel and improved right-angle milling head suitable for mounting on drilling machines constructed and arranged so that the eccentric loads are minimized.

It is still another object of this invention to provide a novel and improved milling head for mounting on power driven drilling machines wherein the tool support is provided with bearings arranged to rigidly and accurately support the tool support preventing chatter and the like.

It is still another object of this invention to provide a novel and improved milling head for use with power driven machines wherein reduction gearing is provided and arranged to maintain proper milling speeds and output torque without excessively loading the machine to which the head is attached.

It is still another object of this invention to provide a novel and improved light weight compact milling attachment for drilling machines constructed and arranged for accuracy of operation and a long trouble-free service life with a minimum of maintenance and repair.

Further objects and advantages will appear from the following description and drawings, wherein FIGURE 1 is a side elevation of a drill unit with a right-angle milling head incorporating this invention mounted thereon;

FIGURE 3 is one end view of the milling head taken along line 3—3 of FIGURE 1; and FIGURE 4 is the other end view of the milling head taken along line 4—4 of FIGURE 1.

Figure 1:
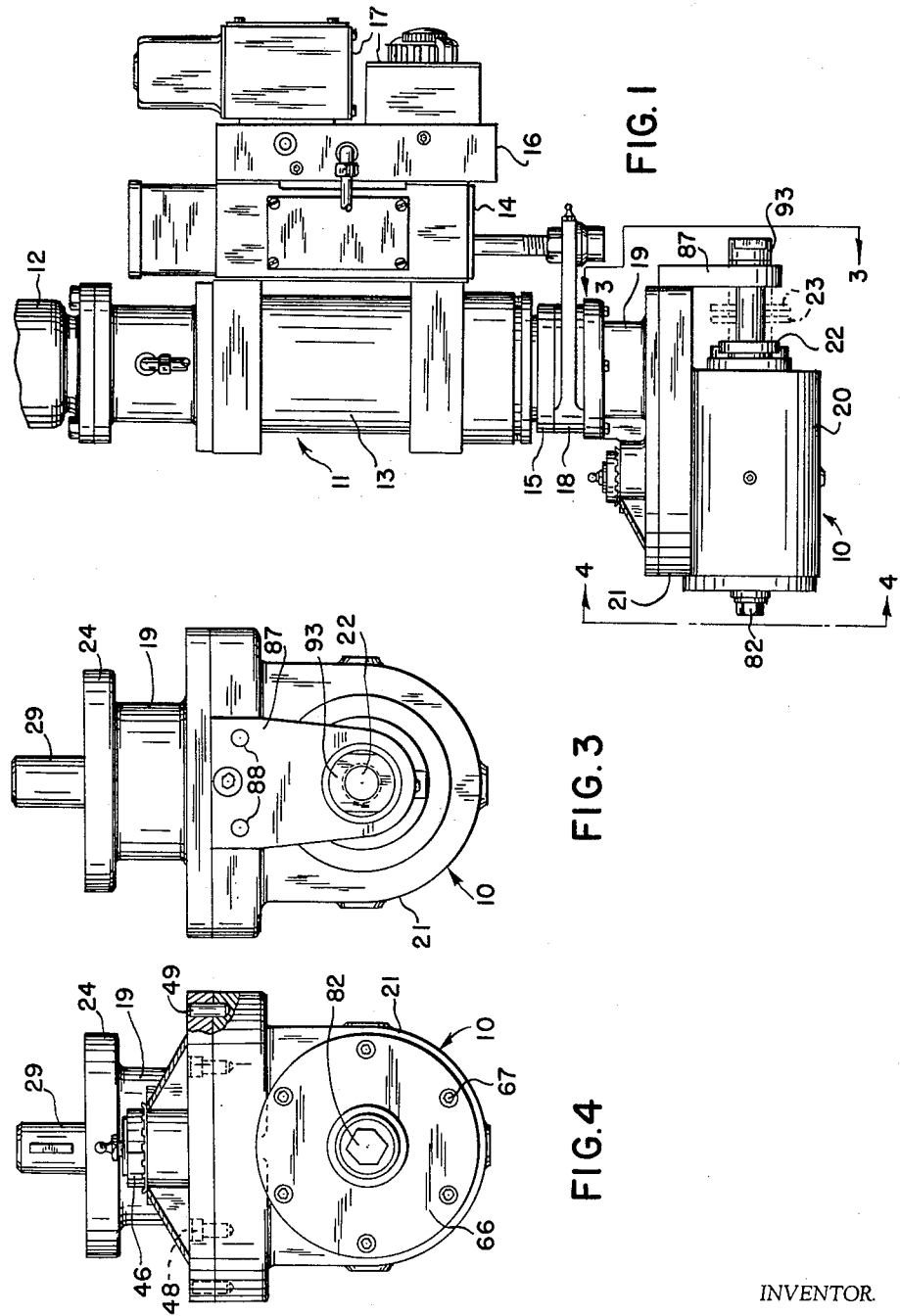

Referring to FIGURE 1, a right-angle milling head 10 incorporating this invention is illustrated mounted on a hydraulically driven drill unit 11. This drill unit 11 includes a hydraulic motor 12 for the rotary drive and a hydraulic piston and cylinder actuator located at 13 to provide the power for reciprocating the carrier 15. A stroke control assembly 14 adjustably controls the operation of the motor 12 and actuator 13. A manifold plate 16 and control valves 17 are operated by the stroke control assembly and in turn operate the hydraulic motor 12 and actuator 13 in a programmed manner. For a more detailed description of the structure and operation of the drill unit, reference should be made to my copending application cited above.

The carrier 15 is provided with a face plate 18 locked against rotation and axially movable by the actuator 13. A rotary drive shaft (not shown) driven by the hydraulic motor 12 is axially fixed relative to the carrier 15.

The right-angle milling head 10 includes a housing assembly consisting of a mounting plate 19 and a main housing member 21 having a laterally extending depending portion 20. The mounting plate 19 is bolted to the face plate 18 of the drill unit to support the milling head for reciprocating movement with the face plate. A tool arbor 22 is journaled on the depending portion 20 of the main housing 21 and is rotated by shafts and gearing described below. Milling cutters 23 are mounted on the tool arbor 22 to perform the actual milling operation.

Figure 2:
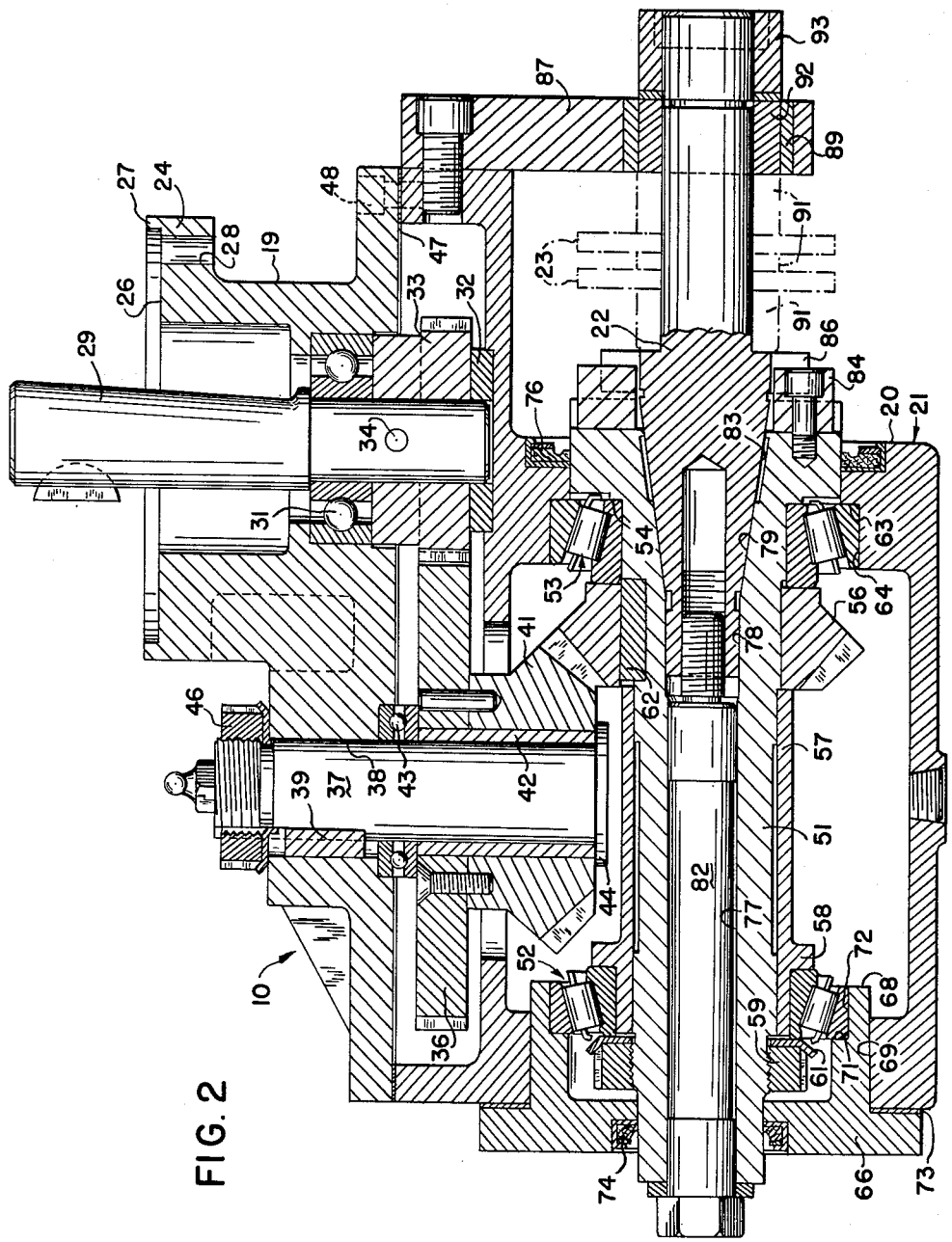
FIGURE 2 is an enlarged side elevation in cross-section illustrating the structural detail of a preferred form of milling head incorporating this invention.

Reference should be made to FIGURE 2 through FIGURE 4 wherein the structural details of the right-angle milling head 10 are illustrated. The mounting plate 19 is formed with the mounting pad 24 having an end face 26 engageable with the end of the face plate 18 and a locating flange 27 engageable with the sides of the face plate. Mounting bolt holes 28 extend through the mounting pad to receive bolts threaded into the face plate of the drill unit.

An input shaft 29 is keyed to the rotary drive shaft of the drill unit and is rotated thereby. The input shaft 29 is journaled on ball bearings 31 and a bronze bushing 32. A pinion gear 33 is mounted on the input shaft 29 by a cross-pin 34. A driven gear 36 meshes with the pinion gear 33 and is journaled on a driven gear arbor 37 which extends through a bore 38 in the mounting plate 19 and is keyed against rotation relative thereto by a key 39. Bolted to the driven gear is a first bevel gear 41 which is journaled with the driven gear 36 on a bearing sleeve 42. A thrust ball bearing 43 extends between the upper face of the driven gear 36 and the mounting plate 19 to absorb thrust loads on the bevel gear 41 and driven gear 36. The lower end of the arbor 37 is formed with a radially extending flange 44 which engages the underside of the bevel gear 41 to secure the gearing in place. A lock nut 46 completes the mounting of the arbor 37.

The main housing 21 is bolted to a lower face 47 of the mounting plate 19 by cap screws 48 and is accurately oriented relative thereto by locating pins 49. The main housing 21 is formed with a depending gear box portion 20 generally to one side of the input shaft 29 in which the bevel gearing is housed and a tool spindle 51 is supported. The spool spindle 51 is journaled on spaced tapered roller bearings 52 and 53. The inner race of the roller bearing 53 engages a shoulder 54 on the tool spindle 51 and is pressed thereagainst by a second bevel gear 56. The second bevel gear 56 is in turn pressed against the inner race by a spacer sleeve 57 extending along the tool spindle 51 and formed with a shoulder 58 abutting the inner race of the bearing 52. A lock nut 59 is threaded onto the tool spindle 51 and through a lock washer 61 presses the inner race of the bearing 52 against the shoulder 58. Therefore, the lock nut 59 serves to securely mount the inner races of both bearings 52 and 53 on the tool spindle 51. A key 62 prevents relative rotation between the second bevel gear 56 and the tool spindle 51.

The outer race of the bearing 53 engages a shoulder 63 on the main housing 21 and is radially supported by an axially extending cylindrical surface 64. To support the outer race of the bearing 52, a spindle bearing retainer 66 is mounted in the end of the main housing 21 by cap screws 67. The bearing retainer is provided with an axially extending flange 68 laterally supported by the surface of a bore 69 in the main housing 21 and formed with a shoulder 71 and cylindrical surface 72 supporting the outer race of the bearing 52. A gasket 73 is positioned between the retainer 66 and the housing 21 to prevent leakage of lubricant. The opposed shoulders 63 and 71 operate to axially locate the bearings 52 and 53 in the housing and thereby axially locate the tool spindle 51. The second bevel gear 56 meshes with the first bevel gear 41 so the tool spindle 51 is driven in response to rotation of the input shaft 29.

In the illustrated embodiment, the driven gear 36 is larger in diameter than the pinion gear 33 preferably providing a speed reduction of about 4 to 1. Also the bevel gears 41 and 56 in the illustrated embodiment are the same size, so that the tool spindle 51 is driven at the same speed as the driven gear 36 but rotates on an axis extending at right angles to the axis of the gear arbor 37. Oil seals 74 and 76 engage the tool spindle 51 at the opposite ends thereof where they extend out of the housing assembly to prevent the leakage of lubricant.

The tool spindle 51 is formed with an axial bore 77 extending from the left end of the tool spindle as viewed in FIGURE 2 to a coaxial larger diameter bore 78. The bore 78, in turn, intersects the inner end of a locking taper 79 in which a tool arbor 22 is mounted. The tool arbor 22 is threaded at its inner end to receive a mounting bolt 82 which is used to draw the tapered portion 83 of the tool arbor into engagement with the taper 79. An arbor key 84 is bolted onto the end of the tool spindle 51 and engages the walls of keyways 86 in the tool arbor to positively prevent rotation between the tool arbor and tool spindle. To mount the tool arbor 22 in the tool spindle 51 it is merely necessary to insert the tool arbor in position and tighten the bolt 82, thus locking the tool arbor in place. When the tool arbor is to be removed, the bolt 82 is loosened and hammered to break the tapers loose.

The tool arbor 22 is supported by an overhanging outboard bearing support arm 87 bolted to the main housing 21 and located by dowel pins 88. A bushing 89 in the bearing support 87 provides radial support for the outer end of the arbor 22. To mount the cutters 23 on the tool arbor 22 it is merely necessary to remove the bearing support 87 and mount the cutters in position with suitable spacers 91 and a bearing sleeve 92 fitting within the sleeve bearing or bushing 89. A lock nut 93 is then threaded onto the outer end of the tool arbor to clamp the spacers and cutters in position. The lock nut 93 is formed with a diameter smaller than the inside diameter of the bushing 89 so that the bearing support 87 can then be slipped over the end of the arbor and bolted to the housing.

Preferably the mounting plate 19 is formed of cast iron or steel and is provided with stiffening ribs to provide rigidity and strength without excessive weight. The main housing 21 and bearing retainers 66 are preferably formed of aluminum to reduce weight. The spaced bearing roller bearings 52 and 53 with the bevel gear 56 mounted therebetween provides a rigid support for the tool spindle 51 within the housing so that any tendency to chatter is minimized. Also, the outboard bearing support 87 supports the end of the arbor eliminating overhanging moments on the tool arbor created by the cutting loads on the cutters. Eccentric loads are minimized also by arranging the gearing so that it is located principally to one side of the axis of the input shaft 29. Therefore, the cutters 23 are located close to the central axis and substantially within the projection of the mounting pad 24. This minimizes eccentric loads of the drill unit and promotes smooth chatter-free accurate operation.

With a unit incorporating this invention, it is possible to perform a variety of milling operations with drilling units, thus greatly increasing the flexibility and capabilities of such drill units.

Although a preferred embodiment of this invention is illustrated, it is to be understood that various modifications and rearrangements of parts may be resorted to without departing from the scope of the invention as defined in the following claims.

What is claimed is:

1. A milling head attachment comprising a housing, a mounting pad on said housing, an input shaft journaled on said housing within said pad adapted to be coupled to and rotated by a power source, a pinion gear on said input shaft within said housing, a driven gear of larger diameter than said pinion gear journaled on said housing and meshing with said pinion gear, a tool spindle, spaced tapered roller bearings mounting said spindle in said housing for rotation about an axis at right angles to said input shaft, a first bevel gear rotated by said driven gear, a second bevel gear on said spindle between said roller bearings meshing with said first bevel gear, a tool arbor removably mounted on said spindle extending at one end out of said housing, a removable bearing support on said housing supporting said one end, said arbor being adapted to support milling cutters between said bearing support and the adjacent roller bearing.

2. A right-angle milling attachment comprising a housing including a first housing member and a second housing member secured thereto, said first housing member being formed with a mounting pad, an input shaft journaled in said first housing extending through said pad, a pinion gear mounted on said input shaft, a gear arbor mounted on said first housing member laterally to one side of said input shaft, a driven gear journaled on said gear arbor meshing with said pinion gear, a first beveled gear journaled on said gear arbor and connected to said driven gear for co-rotation therewith, said second housing being formed with a depending portion extending laterally to one side of said pad and aligned with said first beveled gear, a tool support in said depending portion extending perpendicular to said input shaft and being formed with a radial shoulder, a first taper bearing on said support with its inner race against said shoulder, a second beveled gear on said support locked against rotation relative thereto and positioned against the inner race of said first taper bearing, a second taper bearing on said support, a spacer sleeve on said support engaging said second bevel gear adjacent one end and the inner race of said second taper bearing adjacent its other end, a nut threaded on to said support engaging the inner race of said second bearing and cooperating with said spacer sleeve to axially lock said bearings and said second beveled gear on said support, said second housing member being formed with an opening aligned with said tool support on the end of said depending portion remote from said pad, a cover plate on said second housing member at said opening, said cover plate and said second housing member being formed with opposed walls with one engaging the outer race of each of said taper bearing whereby said support is journaled in said depending portion with said second beveled gear meshing with said first beveled gear, a tool arbor mounted at one end on said tool support adjacent said first taper bearing adapted to support milling cutter axially aligned with said pad, and a removable bearing support arm mounted on said housing supporting the end of said tool arbor remote from said tool support.

3. In combination a drilling machine having a frame, a non-rotating carrier supported in said frame for axial reciprocation, a rotary drive member extending through said carrier, a milling adapter having a housing including a first housing member of ferrous metal and a second housing member of light metal secured thereto, said first housing member being formed with a mounting pad secured to the said carrier, an input shaft journaled in said first housing connected to said drive member, a pinion gear mounted on said input shaft, a gear arbor mounted on said first housing member laterally to one side of said input shaft, a driven gear journaled on said gear arbor meshing with said pinion gear, a first beveled gear journaled on said gear arbor and connected to said driven gear for co-rotation therewith, said second housing being formed with a depending portion extending laterally to one side of said pad and aligned with said first beveled gear, a tool support in said depending portion formed with a radial shoulder, a first taper bearing on said support with its inner race against said shoulder, a second beveled gear on said support locked against rotation relative thereto and positioned against the inner race of said first taper bearing, a second taper bearing on said support, a spacer sleeve on said support engaging said second bevel gear adjacent one end and the inner race of said second taper bearing adjacent its other end, a nut threaded on to said support engaging the inner race of said second bearing and cooperating with said spacer sleeve to axially lock said bearings and said second beveled gear on said support, said second housing member being formed with an opening aligned with said tool support on the end of said depending portion remote from said pad, a cover plate on said second housing member at said opening, said cover plate and said second housing member being formed with opposed walls with one engaging the outer race of each of said taper bearing whereby said support is journaled in said depending portion with said second beveled gear meshing with said first beveled gear, a tool arbor mounted at one end on said tool support adjacent said first taper bearing adapted to support milling cutters axially aligned with said pad, and a removable bearing support arm mounted on said housing supporting the end of said tool arbor remote from said tool support.

References Cited by the Examiner
UNITED STATES PATENTS

| | | |
|---|---|---|
| 1,034,927 | 8/12 | Oehler. |
| 1,355,142 | 10/20 | Hanson. |
| 1,627,934 | 5/27 | Stein _____ 90—17 |
| 2,129,307 | 9/38 | Moo _____ 90—17 X |
| 2,495,927 | 1/50 | Francis. |
| 2,669,162 | 2/54 | Arliss _____ 90—17 |
| 3,083,617 | 4/63 | Swanson et al. _____ 90—17 |

WILLIAM W. DYER, JR., *Primary Examiner.*